Figure 1:
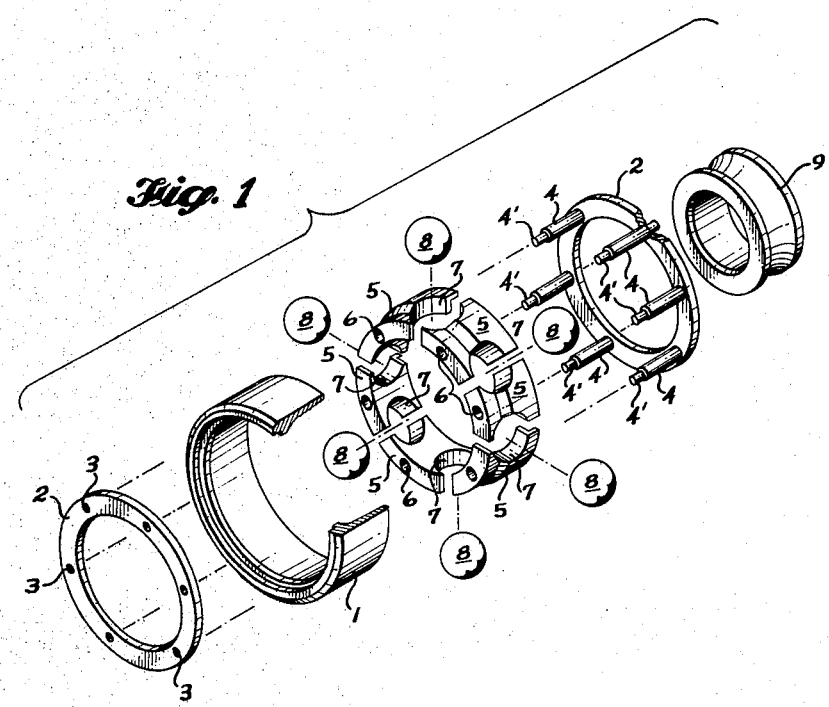

Aug. 10, 1965   J. W. VAN WYK   3,199,934

SELF-LUBRICATING COMPOSITION

Filed Oct. 24, 1963

INVENTOR.
JAN W. VAN WYK
BY
ATTORNEY

United States Patent Office 3,199,934
Patented Aug. 10, 1965

3,199,934
SELF LUBRICATING COMPOSITION
Jan W. Van Wyk, Kirkland, Wash., assignor to The Boeing Company, Seattle, Wash., a corporation of Delaware
Filed Oct. 24, 1963, Ser. No. 318,625
8 Claims. (Cl. 308—199)

This invention relates to a fabricated composition of matter which possesses self-lubricating properties over a wide range of temperatures in an environment varying from nominal atmospheric conditions to vacuum conditions.

Previous attempts to operate bearings at high temperatures in air have required the use of special lubrication systems or have resulted in high friction and bearing failure due to either excessive wear, localized welding or excessive lubrication debris within the bearing. The imposition of vacuum conditions upon a system imposes additional problems among which is the vaporization of many common lubricants. Operation of bearings in vacuum conditions has been accomplished with low vapor pressure fluids. However, all low vapor pressure fluids known have limited temperature and vacuum capabilities. Naturally if a lubricant is omitted in a vacuum situation, the operation is limited to low load capability and very short life.

Of the several lubricants or materials used to promote self-lubrication, each have exhibited drawbacks. Graphite, an extensively used self-lubricating material, is an abrasive in a vacuum environment. Graphite also begins to oxidize at 800° F. or 900° F. in air. This temperature is too low to operate in many current space applications. Teflon composite materials have also been used extensively for low friction between mating surfaces. Teflon has several limitations for this type of use among which is an upper temperature limitation of approximately 500° F. and high friction at low temperatures (below −65 F.). Pure $MoS_2$ based lubrication systems have a maximum operating temperature of 1000° F. which is below the presently desired maximum operating temperature of 1500° F. for most space applications. Also this material lacks strength properties required for these operations.

Lubrication problems exist in both high temperature work and in cryogenic work. The space field presents many temperature problems which tax any lubricant to function properly. The compact structures used in space work demand that a lubricant system function in minimal space with minimal weight. Also once installed a lubricant system must function properly for the life of the structure in which it is installed because repair or rejuvenation of lubrication systems during operation is impossible. Upon realization of these problems, a conclusion is reached that a self-lubricating material presents the most dependable solution to current lubrication demands. Needless to say a self-lubricant is not limited to space systems, but can find many applications in normal industrial operation. One such example would be installing a self-lubricating material in machines where manual lubrication is difficult to practice because the part to be lubricated is difficult to reach or is hidden from view.

It is therefore an object of this invention to assimilate a dependable self-lubricating material.

It is another object of this invention to provide a material which will have self-lubricating properties at cryogenic temperatures in vacuum and in air and at elevated temperatures up to 1500°F. in air and 1500° F. in vacuum.

Still further objects and applications of this invention will become apparent from the following description and appended claims.

Figure 2:
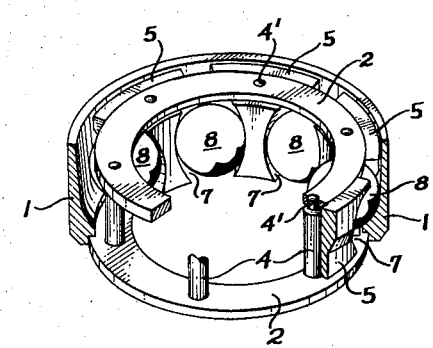

FIGURE 1 represents the parts of a bearing which was used to test the lubrication properties of my compositions.
FIGURE 2 represents an assembly of the parts of FIGURE 1.

The above listed objects of this invention are fulfilled in a composition of matter having the following compositional ranges for each constituent.

| Constituent: | Compositional range |
|---|---|
| Silver (Ag) | 7.50 to 22.50 |
| Platinum (Pt) | 7.50 to 22.50 |
| Molybdenum disulfide ($MoS_2$) | 26.25 to 78.75 |
| Lead oxide (PbO) | 5.45 to 27.55 |
| Silicon dioxide ($SiO_2$) | 0.40 to 1.20 |

This composition of matter in the compositional ranges presented above is a self-lubricating material which will perform the phenomena of maintaining a surface film providing lubricity from cryogenic temperatures (−300° F.) to elevated temperatures (1500° F.). The surface film providing lubricity is maintained by this material at low surface speeds and high surface speeds as well as low stress applications and high stress applications.

FIGURE 1 represents a ball bearing assembly for transmission of energy wherein my lubricating composition is used to advantage. In FIGURE 1, number 1 represents an outer race which serves to cover the ball bearing assembly and retain the functioning members. A jacket retainer is represented by 2 with each side having a circular jacket retainer with a multiplicity of holes therein represented by 3. The holes 3 in the jacket retainer are adapted to pins 4 so that the two jacket retainers can be held a certain distance apart by the pins by use of the extensions 4' on the pins 4. A shaped, lubricant composite material selected from the above compositional range is represented by 5 with a hole 6 therein. Holes 6 are adapted to the lubricant composite material 5 so that pins 4 will fit in holes 6. Each end 7 of the lubricant composite material 5 is shaped so as to retain a ball bearing 8, when two ends 7 are in close proximity. An inner race 9 serves the function of support for the other parts of the ball bearing assembly previously mentioned as well as an operational base for rotation thereon of the ball bearings 8. The remarkable lubrication properties of this alloy can be demonstrated from tests conducted on the bearing shown in FIGURE 1. The bearing shown in FIGURE 1 is constructed with the lubricant sections selected from the compositional range presented above. The bearing is driven by an attached prime mover. The ball bearings in FIGURE 1 as represented by the number 8 were fabricated of stainless steel. After the lubricant composite material was fabricated, X-ray photographs were taken of the separator sections to determine if internal flaws or cracks existed in the material. The inner race, the outer race, the pins and the jacket retainer were fabricated of standard steel alloy materials.

The assembled bearing, containing the lubricant composite material as fabricated in this invention, was tested in a speed spectrum test at speeds up to 10,000 revolutions per minute (r.p.m). Operation was for one hour at 1800 r.p.m., one hour at 3600 r.p.m. and one hour at 5000 r.p.m., followed by a life test at 10,000 r.p.m. After 100 hours of operation at 10,000 r.p.m., the test was terminated to permit inspection of the testing equipment and the bearing assembly. The ball bearings and the races were in excellent condition which can be described as exhibiting a high polish and no indication of wear, abrasion, etc. The low wear value resulting from use of my lubricant compositions indicates the excellent wear characteristics for elevated temperatures and the excellent dry film lubricant attained therein.

The function and explanation of each component's contribution to the overall composition's properties would help in further utilization of this invention. Molybdenum disulfide is present in the composition because this component provides lubricity from cryogenic temperatures of −300° F. up to 800° F. Molybdenum disulfide also provides properties to enable the composition to handle high surface speeds and high stress applications. The range given above for molybdenum disulfide enables the best development of its desirable properties in the matrix.

The self-lubricating properties of molybdenum disulfide when alone or alloyed with other materials are known. The lubricating properties of molybdenum disulfide exhibit a wide temperature range from −300 to 800° F. The crystals of molybdenum disulfide exhibit a plate structure in which successive plates of molybdenum atoms are arranged with two successive layers of sulfur atoms between each layer of molybdenum atoms. The atoms in each layer lie in a plane hexagonal array. A large crystal of molybdenum disulfide is built up of layers of molybdenum attached by strong ionic linkages to adjacent layers of sulfur while the adjacent sulfur layers are held together only by weak homopolar linkage bonds. Thus the crystal consists of laminae having a central molybenum atom array strongly bound to sulfur atoms on each side. These laminae of molybdenum disulfide therefore may be easily separated by mechanical forces into flat plates that have a flaky appearance and have a greasy feel.

While the sulfur layers have only a weak attraction for each other in forming a complete crystal of molybdenum disulfide, the same sulfur atoms have a much greater affinity for metals. Therefore, the molybdenum disulfide plates will attach themselves under certain conditions quite firmly to metals. The sulfur atoms, having weak affinity for each other, will not be held by as great a force as those holding the sulfur to the metal, or even the metal to metal adhesive forces. Therefore, the sulfide present serves as a lubrication mechanism.

It is a scientifically known fact that molybdenum when in a compound form, exhibits very stable tendencies at high and low temperatures. Molybdenum disulfide is no exception to this scientific principle of stability of molybdenum compounds with the additional advantage of the lubricity of the sulfide layers of the compound. However, the molybdenum disulfide lacks many of the metallic properties essential to mechanical applications among which are ductility, compressive strength, tensile strength, malleability, shock resistance, and an absence of brittle failures. Instead one finds molybdenum disulfide exhibiting the non-metallic properties characteristic of the slag (ceramic) group which properties are the opposite of the desired metallic properties. This leaves the problem of finding a suitable matrix for suspending the molybdenum disulfide therein. This matrix must lend the above mechanical properties to the composition plus allowing the molybdenum disulfide to impart its lubricity and high temperature stability to the matrix. These objectives have been achieved by the above range of compositions employing molybdenum disulfide. The resulting compositions are so phenomenal that one can use them in assemblies from −300 to 1500° F. in air or −300 to 1500° F. in vacuum with reliance on their self lubricating properties.

It is thought that lead oxide (PbO) contributes lubricity to the composition for the temperature range of 900° F. to 1300° F. Lead oxide also enables the composition to cope with high stresses through its presence. Repeated tests have enabled determination of the instant invention's lead oxide range so that its desirable contributions are at the maximum.

Silver serves many functions by its presence in the composition. It is thought that silver provides lubricity to the structure from room temperature to beyond 1500° F. Therefore silver can be characterized as the high temperature lubricant in this composition. However, the composition's lubrication under high stress application are also enhanced by the presence of silver. Silver in the composition also acts as a binder in that it imparts greater strength properties to the matrix.

Silicon dioxide's presence in the composition is explained by its action as a binder. Silicon dioxide also imparts strength to the composition because it promotes the sintering of the alloy.

Lubrication problems in a vacuum may seem no different than in air, but actually vacuum conditions impose more serious problems and more rapid wear on any assembly than operation in air does. If a normal lubricant is introduced onto the surfaces of materials in assemblies operating in vacuum conditions, this lubricant will evaporate due to its high vapor pressure. Thus in short periods of time the lubricant would be non-existent.

Any assembly formed of metal and run in a vacuum behaves differently than the same assembly operated in air. It has been found that the absence of an air film on the surfaces of the assembly member causes cohesion of metal between the several parts of the assembly while operating in the vacuum. The metal will adhere or cohere with other metallic surfaces as cohesive contact is made and broken with the other metallic surfaces during operation. The transfer of metal particles occurs rapidly and visible pitting will be evident in a short time. This results in the metal surfaces becoming rough, increasing the noise level and increasing needs in operating power. In air this cohesion which effects the roughening of a bearing in a vacuum does not take place due to the presence of an oxide film on the surfaces of the metal. The use of a self lubricating material stops this type of activity in a vacuum as well as providing a dry film lubricant in air.

The composition of matter in this invention is fabricated by a hot pressing operation which results in the required high fracture strength. To insure the development of the ideal properties of this composition, I practice the following steps in hot pressing. After the components are properly mixed together the composite is heated to 350° F. thus volatilizing any water present. After heating to 350° F., the composite is again mixed followed by pressing the components at room temperature into graphite dies. The graphite dies are constructed to give the composition its desired final configuration. Next I preheat the dies to 1200° F. followed by hot pressing the composition anywhere in the temperature of 1600 to 2500° F. Following the hot pressing step I cool under load to 1400° F.; then I remove the load (pressure) from the dies and cool from 1400 to 500° F. and remove the composition from the graphite die. I practice temperature and time variations in this process as I change the relative proportions in my composition.

The following examples are representative examples of the application of this invention and are in no way intended to limit the invention.

*Example 1*

The following composition is formulated to achieve a maximum lubricity in the resulting composition with the corresponding minimal necessary binding strength. Normal application of this composition would be for a system presenting a minimum coefficient of friction between mating surfaces and a minimal supporting load and stresses.

| Constituent: | Percentage |
|---|---|
| Silver | 7.50 |
| Platinum | 7.50 |
| Molybdenum disulfide | 78.75 |
| Lead oxide | 5.85 |
| Silicon dioxide | .40 |

Fabrication is conducted as previously described with preliminary shaping so as to arrive at the final desired configuration.

Example 2

The following composition is formulated to achieve a maximum strength through presence of the maximum amount of each binder with a corresponding minimal lubricity resulting from a minimal amount of molybdenum disulfide. Normal application of this composition would be for a system presenting maximum loads and stresses with a corresponding minimal friction coefficient between mating surfaces.

| Constituent: | Percentage |
|---|---|
| Silver | 22.50 |
| Platinum | 22.50 |
| Molybdenum disulfide | 26.25 |
| Lead oxide | 27.55 |
| Silicon dioxide | 1.20 |

Fabrication is conducted as previously described with preliminary shaping so as to arrive at the final desired configuration.

Example 3

The following composition is formulated to achieve a compromise in the strength properties and the lubricating properties. The result is a composition having intermediate percentages of each component when compared to Examples 1 and 2. Normal application of this composition would be for a system presenting intermediate loads and stresses along with an intermediate coefficient of friction between the mating surfaces.

| Constituent: | Percentage |
|---|---|
| Silver | 15.00 |
| Platinum | 15.00 |
| Molybdenum disulfide | 52.50 |
| Lead oxide | 16.50 |
| Silicon dioxide | 1.00 |

Fabrication is conducted as previously described with preliminary shaping so as to arrive at the final desired configuration.

I claim:

1. A self-lubricating composition of matter for use in air or vacuum comprised substantially as follows:

| Constituent: | Percentage by weight |
|---|---|
| Silver (Ag) | 7.50 to 22.50 |
| Platinum (Pt) | 7.50 to 22.50 |
| Molybdenum disulfide ($MoS_2$) | 26.25 to 78.75 |
| Lead oxide (PbO) | 5.45 to 27.55 |
| Silicon dioxide ($SiO_2$) | 0.40 to 1.20 |

2. A self-lubricating composition of matter as claimed in claim 1 wherein the weight percentage of silver is 15.00%, platinum is 15.00%, molybdenum disulfide is 52.50%, lead oxide is 16.50% and silicon dioxide is 1.00%.

3. A self-lubricating composition of matter as claimed in claim 1 wherein the weight percentage of silver is 22.50%, platinum is 22.50%, molydbenum disulfide is 26.25%, lead oxide is 27.55%, and silicon dioxide is 1.20%.

4. A self-lubricating composition of matter as claimed in claim 1 wherein the weight percentage of silver is 7.50%, platinum is 7.50%, molybdenum disulfide is 78.75%, lead oxide is 5.85%, and silicon dioxide is .40%.

5. In a ball bearing assembly, the combination comprising an inner race member supporting a plurality of ball bearings, said plurality of ball bearings being separated by inserted sections of a lubricant composite material comprised substantially as follows:

| Constituent: | Percentage by weight |
|---|---|
| Silver (Ag) | 7.50 to 22.50 |
| Platinum (Pt) | 7.50 to 22.50 |
| Molybdenum disulfide ($MoS_2$) | 26.25 to 78.75 |
| Lead oxide (PbO) | 5.45 to 27.55 |
| Silicon dioxide ($SiO_2$) | 0.40 to 1.20 | said sections of a lubricant composite material being held in place around said inner race member by a jacket retainer assembly and said jacket retainer assembly having an outer race member adapted to fit around said jacket retainer assembly.

6. In a ball bearing assembly, the combination comprising an inner race member supporting a plurality of ball bearings, said plurality of ball bearings being separated by inserted sections of a lubricant composite material comprised substantially as follows:

| Constituent: | Percentage by weight |
|---|---|
| Silver (Ag) | 15.00 |
| Platinum (Pt) | 15.00 |
| Molybdenum disulfide ($MoS_2$) | 52.50 |
| Lead oxide (PbO) | 16.50 |
| Silicon dioxide ($SiO_2$) | 1.00 | said sections of a lubricant composite material being held in place around said inner race member by a jacket retainer assembly and said jacket retainer assembly having an outer race member adapted to fit around said jacket retainer assembly.

7. In a ball bearing assembly, the combination comprising an inner race member supporting a plurality of ball bearings, said plurality of ball bearings being separated by inserted sections of a lubricant composite material comprised substantially as follows:

| Constituent: | Percentage by weight |
|---|---|
| Silver (Ag) | 22.50 |
| Platinum (Pt) | 22.50 |
| Molybdenum disulfide ($MoS_2$) | 26.25 |
| Lead oxide (PbO) | 27.55 |
| Silicon dioxide ($SiO_2$) | 1.20 | said section of a lubricant composite material being held in place around said inner race member by a jacket retainer assembly and said jacket retainer assembly having an outer race member adapted to fit around said jacket retainer assembly.

8. In a ball bearing assembly, the combination comprising an inner race member supporting a plurality of ball bearings, said plurality of ball bearings being separated by inserted sections of a lubricant composite material comprised substantially as follows:

| Constituent: | Percentage by weight |
|---|---|
| Silver (Ag) | 7.50 |
| Platinum (Pt) | 7.50 |
| Molybdenum disulfide ($MoS_2$) | 78.75 |
| Lead oxide (PbO) | 5.85 |
| Silicon dioxide ($SiO_2$) | 0.40 | said section of a lubricant composite material being held in place around said inner race member by a jacket retainer assembly and said jacket retainer assembly having an outer race member adapted to fit around said jacket retainer assembly.

References Cited by the Examiner

FOREIGN PATENTS 704,035    2/54    Great Britain.

DON A. WAITE, *Primary Examiner.*